(12) United States Patent
Maleki et al.

(10) Patent No.: US 12,299,443 B2
(45) Date of Patent: May 13, 2025

(54) SAFETY SUPERVISED GENERAL PURPOSE COMPUTING DEVICES

(71) Applicant: Traxen Inc., Plymouth, MI (US)

(72) Inventors: Ali Maleki, Plymouth, MI (US); Martha Elisa Rodriguez Zulueta, Plymouth, MI (US); Prem Kumar Sivakumar, Plymouth, MI (US); Larry Deal, Plymouth, MI (US); Syed Ali, Plymouth, MI (US)

(73) Assignee: Traxen Inc., Plymouth, MI (US)

( * ) Notice: Subject to any disclaimer, the term of this patent is extended or adjusted under 35 U.S.C. 154(b) by 763 days.

(21) Appl. No.: 17/371,088

(22) Filed: Jul. 8, 2021

(65) Prior Publication Data

US 2021/0406008 A1 Dec. 30, 2021

Related U.S. Application Data

(63) Continuation-in-part of application No. 16/438,319, filed on Jun. 11, 2019, now Pat. No. 11,216,748, and a continuation-in-part of application No. 16/438,337, filed on Jun. 11, 2019, now Pat. No. 11,188,847, and a continuation-in-part of application No. 16/438,223, filed on Jun. 11, 2019, now Pat. No. 11,227,234, and a continuation-in-part of application No. 16/438,305, filed on Jun. 11, 2019, now Pat. No. 11,210,609, and a continuation-in-part of application No. 16/355,641,
(Continued)

(51) Int. Cl.
*G06F 9/451* (2018.01)
*G06F 1/3287* (2019.01)
*G06F 9/22* (2006.01)
*G06F 9/26* (2006.01)
*G06F 9/30* (2018.01)
*G06F 9/38* (2018.01)

(52) U.S. Cl.
CPC .............. *G06F 9/223* (2013.01); *G06F 9/262* (2013.01); *G06F 9/30196* (2013.01); *G06F 9/3842* (2013.01)

(58) Field of Classification Search
None
See application file for complete search history.

(56) References Cited

U.S. PATENT DOCUMENTS 10,101,745 B1 * 10/2018 Sun ........................ G08G 1/163
2016/0004535 A1 * 1/2016 Robertson ........... G06F 9/30185
712/205

(Continued)

OTHER PUBLICATIONS

ARM Cortex-R Series, Programmer's Guide, 2014, ARM (Year: 2014).*

*Primary Examiner* — Hyun Nam
(74) *Attorney, Agent, or Firm* — Foley & Lardner LLP

(57) ABSTRACT

A computing device including a plurality of sensors, a system-on-module, a safety microcontroller and a plurality of communication interfaces communicatively coupling the system-on-module, the safety microcontroller and the plurality of sensors together. The system-on module can include an integrated interconnection of a plurality of different types of cores and one or more different types of memory. The system-on module can be configured to control operation and or performance of a system. The safety microcontroller can be configured to provide safety supervision of the system-on-module.

20 Claims, 1 Drawing Sheet

Related U.S. Application Data filed on Mar. 15, 2019, now Pat. No. 11,072,329, and a continuation-in-part of application No. 16/355,657, filed on Mar. 15, 2019, now Pat. No. 11,107,002, and a continuation-in-part of application No. 16/212,108, filed on Dec. 6, 2018, now abandoned.

(60) Provisional application No. 63/049,611, filed on Jul. 8, 2020, provisional application No. 62/683,188, filed on Jun. 11, 2018.

(56) References Cited

U.S. PATENT DOCUMENTS

| | | | |
|---|---|---|---|
| 2018/0075380 A1* | 3/2018 | Perl | G06Q 50/40 |
| 2018/0095806 A1* | 4/2018 | Aneja | G06F 11/00 |
| 2018/0105183 A1* | 4/2018 | Kollmer | G06F 11/0739 |
| 2018/0259966 A1* | 9/2018 | Long | B60W 50/02 |
| 2018/0300660 A1* | 10/2018 | Coan | H04W 4/029 |
| 2018/0314247 A1* | 11/2018 | Sun | B60W 30/00 |
| 2019/0026146 A1* | 1/2019 | Peffers | G06F 9/5044 |
| 2019/0050729 A1* | 2/2019 | Lakshmanan | G06N 3/063 |
| 2019/0163178 A1* | 5/2019 | Sidle | G01S 17/87 |
| 2019/0227538 A1* | 7/2019 | Lassini | G06F 9/4401 |
| 2020/0364953 A1* | 11/2020 | Simoudis | B60W 60/001 |
| 2020/0371581 A1* | 11/2020 | Hureau | G06F 1/3206 |
| 2021/0103658 A1* | 4/2021 | Soryal | G06F 21/51 |
| 2021/0406008 A1* | 12/2021 | Maleki | G06F 9/3842 |
| 2022/0200843 A1* | 6/2022 | Thor | H04L 67/535 |

* cited by examiner

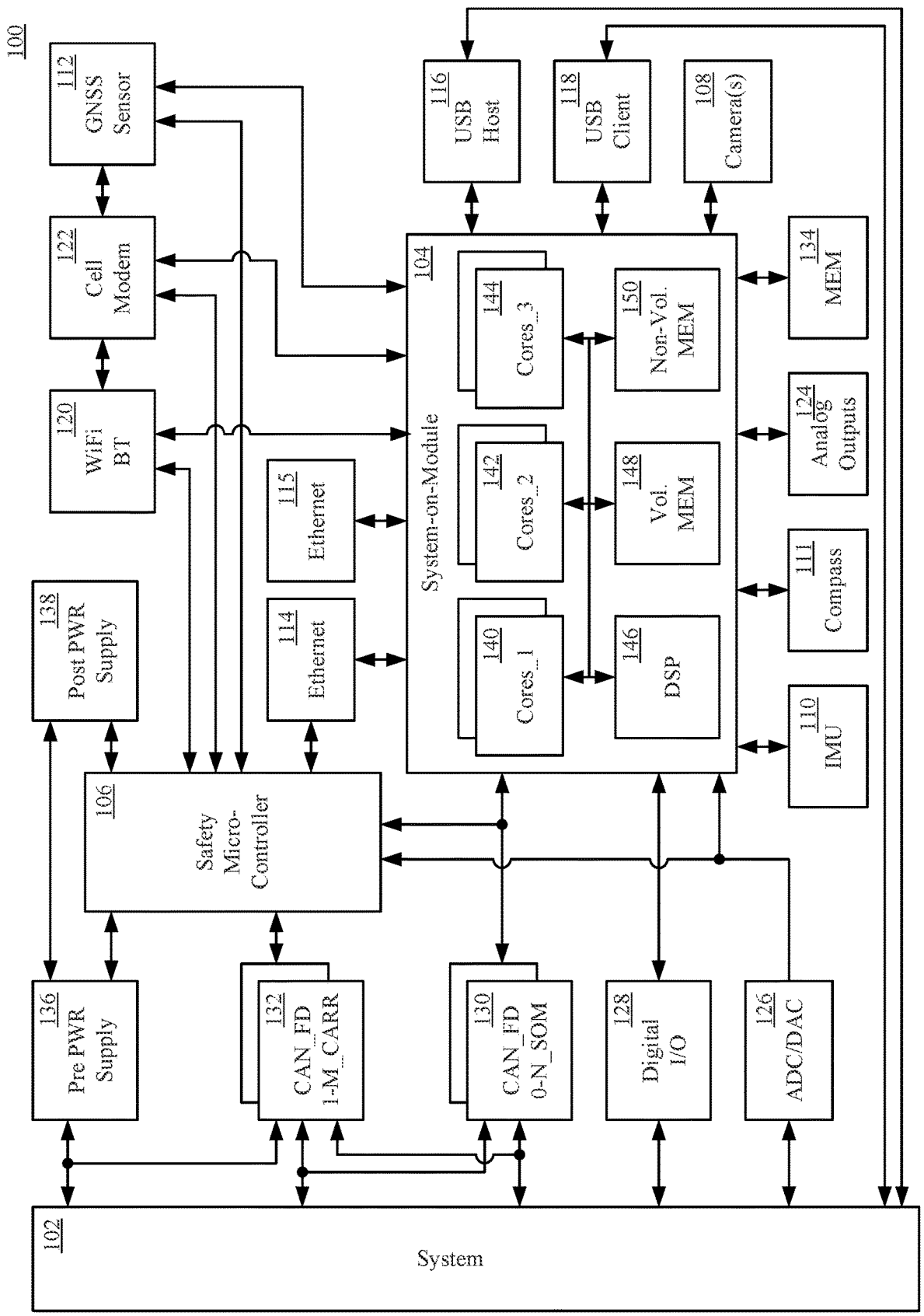

SAFETY SUPERVISED GENERAL PURPOSE COMPUTING DEVICES

CROSS-REFERENCE TO RELATED APPLICATIONS

This application claims the benefit of U.S. Provisional Patent Application No. 63/049,611 filed Jul. 8, 2020, which is incorporated herein in its entirety. This is also a continuation-in-part of U.S. patent application Ser. No. 16/212,108 filed Dec. 6, 2018, U.S. patent application Ser. No. 16/355,641 filed Mar. 15, 2019, U.S. patent application Ser. No. 16/355,657 filed Mar. 15, 2019, U.S. patent application Ser. No. 16/438,319 filed Jun. 11, 2019, U.S. patent application Ser. No. 16/438,337 filed Jun. 11, 2019, U.S. patent application Ser. No. 16/438,223 filed Jun. 11, 2019, U.S. patent application Ser. No. 16/438,305 filed Jun. 11, 2019, and claims the benefit of U.S. Provisional Patent Application No. 62/683,188 filed Jun. 11, 2018, which are incorporated herein in its entirety.

BACKGROUND OF THE INVENTION

This section provides background information related to the present technology which is not necessarily prior art.

Computing systems have made significant contributions toward the advancement of modern society and are utilized in a number of applications to achieve advantageous results. Numerous devices, such as desktop personal computers (PCs), laptop PCs, tablet PCs, netbooks, smart phones, servers, and the like have facilitated increased productivity and reduced costs in communicating and analyzing data in most areas of entertainment, education, business, and science. One common aspect of computing devices is the need for robust highly reliable computing devices for vehicle, robotic, industrial and other similar applications.

SUMMARY OF THE INVENTION

The present technology may best be understood by referring to the following description and accompanying drawings that are used to illustrate embodiments of the present technology directed toward safety supervised computing devices.

In one embodiment, a computing device can include a plurality of sensors, one or more system-on-modules, one or more safety controllers, and a plurality of communication interfaces communicatively coupling the one or more system-on-modules, the one or more safety microcontrollers and the plurality of sensors together. The plurality of sensors can include one or more image sensors communicatively coupled to the system-on-module by one or more of the plurality of communication interfaces. The plurality of sensors can further include one or more inertial measurement units communicatively coupled to the system-on-module by one or more of the plurality of communication interfaces. The plurality of sensors can further include one or more global navigation satellite systems communicatively coupled to the system-on-module by one or more of the plurality of communication interfaces. A system-on module can include a plurality of different types of cores and one or more different types of memory in an integrated interconnection module.

In another embodiment, a computing device can include a processing module, a safety microcontroller, a plurality of communication interfaces and a plurality of sensors. The processing module can include an integrated interconnection of a plurality of different types of cores and one or more different types of memory. The safety microcontroller, communication interfaces and sensors can be communicatively coupled to the processing module.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the FIGURES of the accompanying drawings and in which like reference numerals refer to similar elements and in which:

FIG. 1 shows a computing device in accordance with aspects of the present technology.

DETAILED DESCRIPTION OF THE INVENTION

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Referring to FIG. 1, a computing device, in accordance with aspects of the present technology, is shown. The computing device 100 can be configured to control the operation and or performance of a system 102. In one implementation, the computing device 100 can be an advanced vehicle controller configured to control the operation and or performance of one or more types of vehicles including but not limited to trucks, buses, agriculture equipment, construction equipment, cars, and recreational vehicles (RVs). For example, the computing device can be configured for automated driving of trucks and other vehicles.

The computing device 100 can include one or more system-on-modules (SOM) 104, one or more safety microcontrollers 106, one or more sensors 108-112, and a plurality of communication interfaces 114-132. The computing device 100 can also include one or more memories 134 and or one or more power supplies 136, 138. It is to be appreciated that the one or more SOMs 104, one or more safety controllers 106, one or more sensors 108-112, one or more memories 134, and one or more power supplies 136, 138 can be coupled together directly or indirectly by any combination of one or more communication interfaces 114-132 for transmission of data and or control signals. Furthermore, the one or more SOMs 104, one or more safety controllers 106, one or more sensors 108-112, plurality of communication interfaces 114-132, one or more memories 134, and one or more power supplies 136, 138 can be coupled together directly or indirectly by one or more power supply distribution links. The data and control signal links and power distribution links as illustrated in FIG. 1 are not intended to be exclusive and or comprehensive. Numerous other data and control signal links and power distribution links can be included in the computing device to couple the one or more SOMs 104, one or more safety controllers 106, one or more sensors 108-112, plurality of communication interfaces 114-132, one or more memories 134, and one or more power supplies 136, 138 together. In one implementation, a SOM 104, a safety microcontroller 106, a plurality of sensors, a plurality of communication interfaces 114, one or more memories and one or more power supplies 136, 138 can be arranged on a printed circuit board assembly (PCBA) as a carrier board module. In one implementation, a plurality of carrier board modules can be communicatively coupled together as a set of communicatively coupled computing devices 100.

In one implementation, the one or more sensors 108-112 can include, but not limited to, one or more image sensors 108, one or more inertial measurement units (IMU) 110, one or more compasses 111, one or more global navigation satellite system (GNSS) sensors 112 and the like communicatively coupled to the one or more SOMs 104. In one implementation, the one or more image sensors 108 can include one or more picture or video sensors. For example, one or more charge-coupled device (CCD) image or video sensors can be coupled by one or more serial interfaces to the SOM 104. In one implementation, the one or more IMUs 110 can include, but is not limited to, one or more accelerometers and one or more gyroscopes. The one or more IMUs 110, one or more compasses can also be coupled to the SOM 104. The accelerometers can for example comprise a three-dimensional (3D) accelerometer. In one implementation, the one or more GNSS sensors 112 can include a real-time clock (RTC). Alternatively, the real-time clock (RTC) can be independent of the one or more GNSS sensors 112, and coupled to either the one or more SOMs 104, the one or more safety microcontrollers 106 or both. The one or more GNSS sensors 112 and one or more IMUs 110 can be configured for automotive dead reckoning.

The plurality of communication interfaces 114-132 can be configured to communicatively couple the SOM 104, the safety controller 106 and the system 102 together. The plurality of communication interfaces 114-132 can also provide a communication interface to the system 102. For example, one or more control area network (CAN) interfaces 130, 132, one or more universal serial bus (USB) interfaces 116, 118, one or more Ethernet interfaces 114, 115, one or more WiFi interfaces, one or more Bluetooth interfaces and or the like can provide one or more wired or wireless communication interfaces to the system 102. In one implementation, the plurality of communication interfaces 114-132 can include one or more wired interfaces including, but not limited to, one or more Ethernet interfaces 114, 115 one or more universal serial bus (USB) interfaces 116, 118, one or more high-definition multimedia interfaces (HDMI), one or more local interconnect network (LIN) interfaces and the like. In one implementation, the one or more Ethernet interfaces can include one or more gigabit Ethernet interfaces. The one or more Ethernet interfaces can be configured for debug and development of the computing device 100. In one implementation, the one or more USB interfaces can include one or more USB 2.0 interfaces and one or more USB 3.0 interfaces. The one or more USB interfaces can include one or more USB host interfaces 116 and or one or more USB client interfaces 118. The plurality of communication interfaces 114-132 can also include one or more wireless interfaces including, but not limited to, one or more WiFi interfaces, one or more Bluetooth (BT) interface 120, and one or more cellular telephone modems 122. In one implementation, the wireless interfaces can provide a full set of internet-of-thing (IoT) features. In one implementation, the one or more WiFi interfaces can be 802.11a/b/g/n/ac interfaces, and can include the ability to be used as a hotspot. In one implementation, the one or more Bluetooth interfaces can be Bluetooth 5, dual-mode interfaces, that can include basic rate, extended rate and low energy functions. In one implementation, the one or more cellular telephone modems 122 can include fourth or fifth generation (4G, 5G) long term evolution (LTE), universal mobile telecommunications system (UMTS) and or global system for mobile communications (GSM) bands. The plurality of communication interfaces 114-132 can also include one or more analog outputs 124, one or more analog-to-digital/digital-to-analogy converters (ADC/DACs) 126, one or more digital input/outputs 128, one or more control area network (CAN) interfaces 130, 132 and one or more universal asynchronous receiver-transmitters (UART). In one implementation, one or more CAN interfaces 130 can communicatively couple the SOM 104 to the system 102. One or more CAN interfaces 132 can also communicatively couple the safety microcontroller 106 to the system 102. One or more CAN interfaces 130 can also be shared with the SOM 104 and safety microcontroller 106. In one implementation, the one or more CAN interface 130, 132 can be control area network flexible-data rate (CAN-FD) compliant. In one implementation, the one or more ADC/DAC interfaces 126 can include be a plurality of protected ADCs. In one implementation, the one or more ADC/DAC interfaces 126 can include a plurality of buffered DACs. In one implementation, the one or more digital I/O interfaces 128 can include a plurality of general-purpose input output (GPIO) interfaces communicatively coupling the SOM 104 to the system 102. The SOM 104 can be configured to act as a gateway between one or more of the sensors 108-112, one or more communication interfaces 114-132 and or the system 102. The SOM 104 and or safety microcontroller 106 can also be configured to perform signal integrity checks on the one or more communication interfaces 114-132 and or one or more sensors 108-112.

In one implementation, the safety microcontroller 106 can comprise a multi core safety supervisory processor. The safety microcontroller 106 can be configured to execute one or more supervisory applications that watch the execution of one or more system control application executing on the SOM 104 to determine if the execution of the one or more system control applications differs from one or more pre-determined system control execution parameters. When the one or more supervisory applications determines a fault based on a detected difference between the execution of the one or more control application and the one or more pre-determined systems control execution parameters, the one or more supervisory applications can respond to mitigate or correct the determined fault. For example, the one or more supervisory applications can interrupt system control outputs from the SOM 104 flowing through the one or more CAN interfaces 130, 132, Ethernet interfaces 114, 115, or the like interfaces. The safety microcontroller 106 can also be configured to enable and or disable communications between the SOM 104 and the system 102 through one or more of the communication interfaces 114-132. Alternatively or in addition, the one or more supervisory applications can initiate execution of one or more backup system control applications on the safety microcontroller 106 to provide a backup or reduced set of system control functions. In one implementation, the safety microcontroller 106 can be an automotive safety integrity level D (ASIL-D) compliant safety supervisor processor. The safety microcontroller 106 can include one CPU channel in lockstep. The safety microcontroller 106 can monitor data in common with the SOM 104 to detect and or resolve faults. The safety microcontroller 106 can be configured to detect, diagnose and safely mitigate the occurrence of faults. The safety microcontroller 106 can execute one or more safety based mechanisms, that can include software test libraries, built in self tests (BIST) and the like. The test libraries, BISTs and the like can provide fault diagnostic capabilities. The one or more supervisory applications executing on the safety microcontroller 106 can be separate software from the one or more system control applications executing on the SOM 104, thereby permitting the computing device 100 to be architecture independent of the given SOM 104 implementation.

In one implementation, the SOM can include a plurality of different types of processor cores 140-146, and one or more types of memory 148, 150 communicatively coupled together by one or more buses of the SOM 104. In one implementation, the one or more types of cores can include one or more different types of instruction set architectures. In one implementation, the one or more types of cores can include, but are not limited to, one or more advanced reduced instruction set cores (ARM) 140-144, one or more digital signal processor (DSP) cores 146 and one or more graphics processing unit (GPU) cores. For example, the SOM 104 can include a plurality of Cortex-A72 cores, a plurality of A53 cores, a plurality of Cortex-M4F cores, and one or more HIFI4 DSP cores. The one or more type of memory 148, 150 of the SOM can include, but is not limited to, volatile memory 148 and non-volatile memory 150. For example, the memory can include synchronous dynamic random-access ram (SDRAM) memory and Flash memory. In multi-SOM implementations, the SOMs 104 can be homogeneous, including the same set of cores and memory. Alternatively, the SOMs can be heterogenous, wherein SOMs can have different combinations of cores and or memory in type and or number. In multi-SOM implementations, the SOMs can be synchronized by clock sharing through a CAN interface 130, 132, Ethernet interface 114, 115 or the like.

Computing device executable instructions (e.g., software) executing on the SOM 104 and or the safety microcontroller 106 can include, but is not limited to, an embedded Linux operating system and real-time operating systems (RTOS). In one implementation, an embedded Linux operating system such as a Yocto project open source embedded operating system can execute on the SOM 104. The Yocto embedded Linux software can provide development tools including, but not limited to, a compiler and one or more debuggers. In one implementation, a real-time operating system such as FreeRTOS or SafeRTOS can execute on the safety microcontroller 106. The real-time operating system can be based on deterministic priority based scheduling. The real-time operating system can be configured to schedule operation of supervisory applications, safety monitors, safety functions and the like. The computing device executable instructions executing on the SOM 104 and the safety microcontroller 106 can further include self-diagnostic programs, and software for peripherals such as the GNSS, CAN, GPIO and IMU. The computing device executable instructions executing on the SOM 104 and the safety microcontroller 106 can further include dataloggers, over-the-air (OTA) interfaces, and other application software. One or more power supplies of the SOM 104, communication interfaces 114-132, and sensors 108-112 can be coupled through the safety microcontroller 106, to enable the RTOS, safety monitors or the like to provide protection from hazards after power on, brown out, or the like events. The RTOS, safety monitors or the like can be configured to place the system 100 into a predetermined safe state within a specified time period.

The safety controller 106 and or SOM 104 can be configured to wake the computing device 100 in response to communications on the one or more CAN interfaces 130, 132. For example, the computing device 100 can wake upon ignition in a vehicle system 102. The safety controller 106 and or SOM 104 can also be configured to place the SOM 104, the SOM 104 and safety controller 106, or the complete computing device 100 in a low power mode in response to one or more inputs or states of the system 102. The safety controller 106 and or SOM 104 can also be configured to remain powered on for a period of time in the absence of a power source. For example, the one or more power supplies 138, 138 can include a battery, capacitor or the like to provide backup power to the safety microcontroller 106 to enable the supervisory applications, safety monitors, safety functions and or the like to continue to operate at least for a predetermined period of time in the event of a power failure so that the system 102 can be placed in a safe state. The safety controller 106 and or SOM 104 can also be configured to remain powered on when the system 102 is powered off to perform housekeeping functions of the computing device 100.

The following examples pertain to specific technology embodiments and point out specific features, elements, or steps that may be used or otherwise combined in achieving such embodiments.

Example 1 includes computing device comprising: a plurality of sensors; a system-on-module configured to control operation and or performance of a system; a safety microcontroller configured to provide safety supervision of the system-on-module; and a plurality of communication interfaces communicatively coupling the system-on-module, the safety microcontroller and the plurality of sensors together.

Example 2 includes the computing device of Example 1, wherein the plurality of sensors include: one or more image sensors communicatively coupled to the system-on-module by one or more of the plurality of communication interfaces; one or more inertial measurement units communicatively coupled to the system-on-module by one or more of the plurality of communication interfaces; and one or more global navigation satellite systems communicatively coupled to the system-on-module by one or more of the plurality of communication interfaces.

Example 3 includes the computing device of Example 1, wherein the system-on-module includes a plurality of different types of cores and one or more different types of memory in an integrated interconnection module.

Example 4 includes the computing device of Example 3, wherein the plurality of different types of cores include: one or more advanced reduced instruction set computing machine (ARM) processors; one or more mixed-signal floating point unit advanced reduced instruction set computing machine (ARM) processors; and one or more floating-point digital signal processors (DSP).

Example 5 includes the computing device of Example 4, wherein the one or more advanced reduced instruction set computing machine (ARM) processors include: one or more advanced reduced instruction set computing machine (ARM) processors including in-order decode, and conditional and indirect branch prediction; and one or more advanced reduced instruction set computing machine (ARM) processors including out-of-order decode, and two-level branch prediction.

Example 6 includes the computing device of Example 3, wherein the one or more different types of memory include: flash memory; and synchronous dynamic random-access memory (SDRAM).

Example 7 includes the computing device of Example 1, wherein the plurality of communication interfaces comprise interfaces selected from a group consisting of one or more Ethernet interfaces, one or more cellular interfaces, one or more WiFi interfaces, one or more Bluetooth interfaces, one or more universal serial bus interfaces (USB), one or more analog output interfaces, one or more analog-to-digital converter interfaces, one or more digital-to-analog interfaces, one or more digital input/output interfaces, one or more control area network (CAN) interfaces, one or more analog-to-digital converter (ADC) interfaces, one or more digital-to-analog converter (DAC) interfaces, and one or more external memory interfaces.

Example 8 includes the computing device of Example 1, further comprising one or more power supplies coupled to the safety microcontroller.

Example 9 includes a computing device comprising: a processing module including an integrated interconnection of a plurality of different types of cores and one or more different types of memory; a safety microcontroller communicatively coupled to the processing module; a plurality of communication interfaces coupled to the processing module; and a plurality of sensors communicatively coupled to the processing modules.

Example 10 includes the computing device of Example 9, further comprising one or more memories externally coupled to the processing module.

Example 11 includes the computing device of Example 9, further comprising one or more power supplies coupled to the processing module, one or more of the plurality of communication interfaces and one or more of the plurality of sensors through the safety microcontroller.

Example 12 includes the computing device of Example 9, wherein the safety microcontroller 106 is configured to execute one or more supervisory applications that watch the execution of one or more system control applications executing on the processing module to determine if the execution of the one or more system control applications differs from one or more predetermined system control execution parameters.

Example 13 includes the computing device of Example 9, wherein the plurality of sensors include one or more inertial measurement sensors.

Example 14 includes the computing device of Example 9, wherein the plurality of sensors include one or more image capture sensors.

Example 15 includes the computing device of Example 9, wherein the plurality of sensors include one or more sensors further coupled to the safety microcontroller.

Example 16 includes the computing device of Example 9, wherein the plurality of communication interfaces include one or more cell modems.

Example 17 includes the computing device of Example 9, wherein the plurality of communication interfaces include one or more WiFi controllers.

Example 18 includes the computing device of Example 9, wherein the plurality of communication interfaces include one or more Bluetooth controllers.

Example 19 includes the computing device of Example 9, wherein the plurality of communication interfaces include one or more Ethernet controllers.

Example 20 includes the computing device of Example 9, wherein the plurality of communication interfaces include one or more Universal Serial Bus (USB) controllers.

Example 21 includes the computing device of Example 9, wherein the plurality of communication interfaces include one or more local interconnect network (LIN) controllers.

Example 22 includes the computing device of Example 9, wherein the plurality of communication interfaces include one or more analog output interfaces.

Example 23 includes the computing device of Example 9, wherein the plurality of communication interfaces include one or more digital input/output interfaces.

Example 24 includes the computing device of Example 9, wherein the plurality of communication interfaces include one or more one or more analog-to-digital converters (ADC).

Example 25 includes the computing device of Example 9, wherein the plurality of communication interfaces include one or more digital-to-analog converters (DAC).

Example 26 includes the computing device of Example 9, wherein the plurality of communication interfaces include one or more control are network (CAN) interfaces.

Example 27 includes the computing device of Example 9, wherein the plurality of communication interfaces include one or more communication interfaces further coupled to the safety microcontroller.

Example 28 includes the computing device of Example 9, wherein the processing module comprises: one or more advanced reduced instruction set computing machine (ARM) processors; one or more mixed-signal floating point unit advanced reduced instruction set computing machine (ARM) processors; one or more floating-point digital signal processors (DSP); flash memory; and synchronous dynamic random-access memory (SDRAM).

Example 29 includes the computing device of Example 9, wherein the one or more different types of memory of the processing module store one or more sets of instructions that when executed by the plurality of different types of cores of the processing module perform a ground vehicle control method comprising: detecting a plurality of driving parameters associated with a ground vehicle as the ground vehicle maneuvers along segments of a roadway; detecting a plurality of ground vehicle control inputs associated with an operation of the ground vehicle received from one or more one or more of the sensors and one or more of the communication interfaces as the ground vehicle maneuvers along the segments of the roadway; and adjusting operation of the ground vehicle as the ground vehicle maneuvers along respective segments of the roadway to maintain the operation of the ground vehicle within an operation threshold for the respective segments of the roadway based on the detected driving parameters and ground vehicle control inputs of the respective segments of the roadway. The automated cruise control system of Example 27 is further described in U.S. patent application Ser. No. 16/212,108, filed Dec. 6, 2018, which is incorporated herein in its entirety.

Example 30 includes the computing device of Example 9, wherein the one or more different types of memory of the processing module store one or more sets of instructions that when executed by the plurality of different types of cores of the processing module perform a ground vehicle control method comprising: determining a target speed window based on one or more of one or more ground vehicle operating parameters and one or more driving environment parameters; determining a target vehicle performance plan based on the target speed window and one or more of the one or more ground vehicle operating parameters, one or more driver control inputs and the one or more driving environment parameters utilizing a Generalized Predictive Control (GPC) over a receding time window based on torque, velocity and gear to reduce energy consumption by a ground vehicle; and generating one or more vehicle operating indicators for output to a driver of the ground vehicle based on the determined target speed window and the determined target vehicle performance plan. The ground vehicle control technique of Example 28 is further described in U.S. patent application Ser. No. 16/355,641, filed Mar. 15, 2019, which is incorporated herein in its entirety.

Example 31 includes the computing device of Example 9, wherein the one or more different types of memory of the processing module store one or more sets of instructions that when executed by the plurality of different types of cores of the processing module perform a ground vehicle control method comprising: training a reinforcement learning controller based on alternating behavior training data and target training data for a simulated ground vehicle environment, during a simulation mode; further training the simulation trained reinforcement learning controller based on a ground vehicle environment, during an operating mode of a ground vehicle; and outputting an action based on a current state of the ground vehicle environment utilizing the simulation and environment trained reinforcement learning controller, during the operating mode of the ground vehicle. The reinforcement learning based ground vehicle control technique of Example 29 is further described in U.S. patent application Ser. No. 16/355,657, filed Mar. 15, 2019, which is incorporated herein in its entirety.

Example 32 includes the computing device of Example 9, wherein the one or more different types of memory of the processing module store one or more sets of instructions that when executed by the plurality of different types of cores of the processing module perform a ground vehicle control method comprising: self-train for an energy consumption solution based on one or more control parameters including environment information and vehicle operating information, wherein the environment information includes one or more of current roadway topography, future roadway topography, traffic information, and traffic control device state and vehicle operating information includes one or more of fuel map and vehicle mass; and generate one or more control signals based on the energy consumption solution for output in a vehicle control mode selected from the group consisting of an active control mode, an assist control mode, a coaching control mode, and a passive control mode. The predictive control techniques for ground vehicles of Example 30 are further described in U.S. patent application Ser. No. 16/438,319, filed Jun. 11, 2019, which is incorporated herein in its entirety.

Example 33 includes the computing device of Example 9, wherein the one or more different types of memory of the processing module store one or more sets of instructions that when executed by the plurality of different types of cores of the processing module perform a ground vehicle control method comprising: receiving a stochastic Monte Carlo inferred model of a set of ground vehicle drivers; generating training data by sampling actions for given states of the stochastic Monte Carlo model in a simulated ground vehicle environment and collecting traces of sequences of states and probabilities of actions; pre-training using the training data including the collected traces of sequences of states and probability of action to generate a stochastic policy; and training a reinforcement learning controller using the stochastic policy. The pre-training of a reinforcement learning ground vehicle controller using Monte Carlo simulation of Example 31 is further described in U.S. patent application Ser. No. 16/438,337, filed Jun. 11, 2019, which is incorporated herein in its entirety.

Example 34 includes the computing device of Example 9, wherein the one or more different types of memory of the processing module store one or more sets of instructions that when executed by the plurality of different types of cores of the processing module perform a ground vehicle control method comprising: constructing one or more predictive models of ground vehicle operation; predicting a plurality of scenarios of the ground vehicle operation; determining Monte Carlo simulation results using the predicted plurality of scenarios and the one or more predictive models; receiving an observed scenario and associated observed efficiency/score/parameter of the ground vehicle operation; determining a best possible scenario and associated best efficiency that could have happened for the observed scenario based on the Monte Carlo simulation results; determining a worst possible scenario and associated worst efficiency that could have happened for the observed scenario based on the Monte Carlo simulation results; and normalize the observed efficiency as a function of the best efficiency and the worst efficiency. The normalized performance comparison techniques of Example 32 are further described in U.S. patent application Ser. No. 16/438,223, filed Jun. 11, 2019, which is incorporated herein in its entirety.

Example 35 includes the computing device of Example 9, wherein the one or more different types of memory of the processing module store one or more sets of instructions that when executed by the plurality of different types of cores of the processing module perform a ground vehicle control method comprising: receiving input information associated with ground vehicle operation; processing the input information, including evaluating performance of the ground vehicle operation; generating output information based upon evaluation of the ground vehicle operation, including output information associated with performance of the ground vehicle operation; creating interface information configured to convey results of the evaluation and wherein the interface information includes guidance on future implementation of an operational characteristic of the ground vehicle with respect to realizing a performance objective; and presenting the interface information, including presenting information indicating metrics corresponding to performance of the ground vehicle operation. The user vehicle operation interface systems and methods of Example 33 is further described in U.S. patent application Ser. No. 16/438,305, filed Jun. 11, 2019, which is incorporated herein in its entirety.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A computing device comprising:
a plurality of communication interfaces;
a system-on-module coupled to a system by one or more of the plurality of communication interfaces, wherein the system-on-module is configured to execute one or more system control applications that control operation and or performance of the system;
a safety microcontroller coupled in parallel to the system-on-module and the system by one or more of the plurality of communication interfaces, wherein the safety microcontroller is configured to execute one or more supervisory applications that provide safety supervision of the system-on-module based on monitoring data in common with the system-on-module and the system, wherein the one or more supervisory applications executing on the safety microcontroller are separate from the one or more system control applications executing on the system-on-module; and
a plurality of sensors coupled to the system-on-module and the safety microcontroller by one or more of the plurality of communication interfaces.

2. The computing device of claim 1, wherein the plurality of sensors include:
one or more image sensors communicatively coupled to the system-on-module by one or more of the plurality of communication interfaces;
one or more inertial measurement units communicatively coupled to the system-on-module by one or more of the plurality of communication interfaces; and
one or more global navigation satellite systems communicatively coupled to the system-on-module by one or more of the plurality of communication interfaces.

3. The computing device of claim 1, wherein the system-on-module includes a plurality of different types of cores and one or more different types of memory in an integrated interconnection module.

4. The computing device of claim 3, wherein the plurality of different types of cores include:
one or more advanced reduced instruction set computing machine (ARM) processors;
one or more mixed-signal floating point unit advanced reduced instruction set computing machine (ARM) processors; and
one or more floating-point digital signal processors (DSP).

5. The computing device of claim 4, wherein the one or more advanced reduced instruction set computing machine (ARM) processors include:
one or more advanced reduced instruction set computing machine (ARM) processors including in-order decode, and conditional and indirect branch prediction; and
one or more advanced reduced instruction set computing machine (ARM) processors including out-of-order decode, and two-level branch prediction.

6. The computing device of claim 3, wherein the one or more different types of memory include:
flash memory; and
synchronous dynamic random-access memory (SDRAM).

7. The computing device of claim 1, wherein the plurality of communication interfaces comprise interfaces selected from a group consisting of one or more Ethernet interfaces, one or more cellular interfaces, one or more WiFi interfaces, one or more Bluetooth interfaces, one or more universal serial bus interfaces (USB), one or more analog output interfaces, one or more analog-to-digital converter interfaces, one or more digital-to-analog interfaces, one or more digital input/output interfaces, one or more control area network (CAN) interfaces, one or more analog-to-digital converter (ADC) interfaces, one or more digital-to-analog converter (DAC) interfaces, and one or more external memory interfaces.

8. The computing device of claim 1, further comprising one or more power supplies of the system-on-module are coupled through the safety microcontroller whereby the safety microcontroller provides protection from hazards after power on and brown out.

9. A computing device comprising:
a plurality of communication interfaces;
a processing module coupled to a system by one or more of the plurality of communication interfaces, wherein the processing module executes one or more system control applications to control the system, and wherein the processing module includes an integrated interconnection of a plurality of different types of cores and one or more different types of memory;
a safety microcontroller communicatively coupled in parallel to the processing module and the system by one or more of the plurality of communication interfaces, wherein the safety microcontroller executes one or more supervisory applications with real-time scheduling to determine if execution of the one or more system control applications on the system-on-module microcontroller differs from one or more predetermined system control execution parameters, and wherein the one or more supervisory applications executing on the safety microcontroller are separate from the one or more system control applications executing on the processing module; and
a plurality of sensors communicatively coupled to the processing modules.

10. The computing device of claim 9, further comprising one or more memories externally coupled to the processing module.

11. The computing device of claim 9, further comprising one or more power supplies coupled to the processing module, one or more of the plurality of communication interfaces and one or more of the plurality of sensors through the safety microcontroller.

12. The computing device of claim 9, wherein the safety microcontroller is configured to execute one or more supervisory applications that watch the execution of one or more system control applications executing on the processing module to determine if the execution of the one or more system control applications differs from one or more predetermined system control execution parameters.

13. The computing device of claim 9, wherein the plurality of sensors include one or more inertial measurement sensors.

14. The computing device of claim 9, wherein the plurality of sensors include one or more image capture sensors.

15. The computing device of claim 9, wherein the plurality of sensors include one or more sensors further coupled to the safety microcontroller.

16. The computing device of claim 9, wherein the plurality of communication interfaces include one or more cell modems.

17. The computing device of claim 9, wherein the plurality of communication interfaces include one or more WiFi controllers.

18. The computing device of claim 9, wherein the plurality of communication interfaces include one or more Bluetooth controllers.

19. The computing device of claim 9, wherein the plurality of communication interfaces include one or more Ethernet controllers.

20. The computing device of claim 9, wherein the plurality of communication interfaces include one or more Universal Serial Bus (USB) controllers.

* * * * *